(12) United States Patent
Kim et al.

(10) Patent No.: US 6,471,359 B1
(45) Date of Patent: Oct. 29, 2002

(54) PROJECTION LENS OF PROJECTION DISPLAY APPARATUS

(75) Inventors: Dong Ha Kim, Kyungki-Do (KR); Jong Myung Park, Kyungki-Do (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/982,693

(22) Filed: Oct. 18, 2001

(30) Foreign Application Priority Data

Jul. 27, 2001 (KR) ........................................ 2001-45373

(51) Int. Cl.$^7$ ................................................ G03B 21/00
(52) U.S. Cl. ........................ 353/122; 359/651; 359/691; 353/97
(58) Field of Search ................................ 353/100, 101, 353/97; 359/649, 651, 691, 692, 799

(56) References Cited

U.S. PATENT DOCUMENTS

| | | | | |
|---|---|---|---|---|
| 5,109,299 A | * | 4/1992 | Kato | ........................... 359/692 |
| 5,319,495 A | * | 6/1994 | Yamada | ...................... 359/691 |
| 5,844,725 A | * | 12/1998 | Itoh | ........................... 359/692 |
| 6,172,816 B1 | * | 1/2001 | Tadic-Galeb et al. | ....... 359/649 |
| 6,220,713 B1 | * | 4/2001 | Tadic-Galeb et al. | ......... 353/77 |
| 6,280,035 B1 | * | 8/2001 | Tadic-Galeb et al. | ......... 353/31 |

* cited by examiner

*Primary Examiner*—William Dowling
(74) *Attorney, Agent, or Firm*—Darby & Darby

(57) ABSTRACT

Disclosed is a projection lens of a projection display apparatus including a first lens group arranged upstream from a screen, the first lens group having a negative power and including at least one aspherical lens element and at least three spherical lens elements, the lens element of the first lens group spaced away from the screen by a maximum distance having a positive power, a second lens group arranged upstream from the first lens group, the second lens group having a positive power and including a triple cemented lens composed of three lens elements cemented together, and at least one lens element arranged at one side of the triple cemented lens opposite to the screen, and an aperture stop arranged between the first and second lens groups.

16 Claims, 6 Drawing Sheets

STOP

PROJECTION LENS OF PROJECTION DISPLAY APPARATUS

BACKGROUND OF THE INVENTION

1. Field of the Invention

The present invention relates to a projection display apparatus, and more particularly to a projection lens of a projection display apparatus which not only has a wide field of view of 60° or more to reduce the thickness of a projection TV (or monitor), to which the projection lens is applied, but also has a long back focal length to allow an easy arrangement of color separating/synthesizing optical elements while having a telecentric structure to achieve an enhancement in the performance of the color separating/synthesizing optical elements and a reduction in longitudinal chromatic aberration.

2. Description of the Prior Art

Generally, modern persons have an increased tendency to enjoy private leisure and recreation. For instance, they have an increased tendency to see movies or other pictures in their private spaces. In pace with such an increased tendency, active research and development have been made to provide image display devices having a screen of an increased size.

By virtue of such research and development coping with the tendency to provide a screen with an increased size, data projectors, projection TVs, and projection monitors have been proposed, which utilize a projection technique incorporating the concept of projectors. These devices use a projection display apparatus.

The tendency to provide a screen with an increased size has also resulted in active development of rear projection type TVs (or monitors) that utilize a projection method to constitute a display system. Such rear projection type TVs (or monitors) require an enhanced picture quality to cope with an increased screen size, a minimized system size including a minimized thickness, an increase in the minimum number of pixels, an increased amount of light, and an increased uniformity of illumination.

Figure 1:
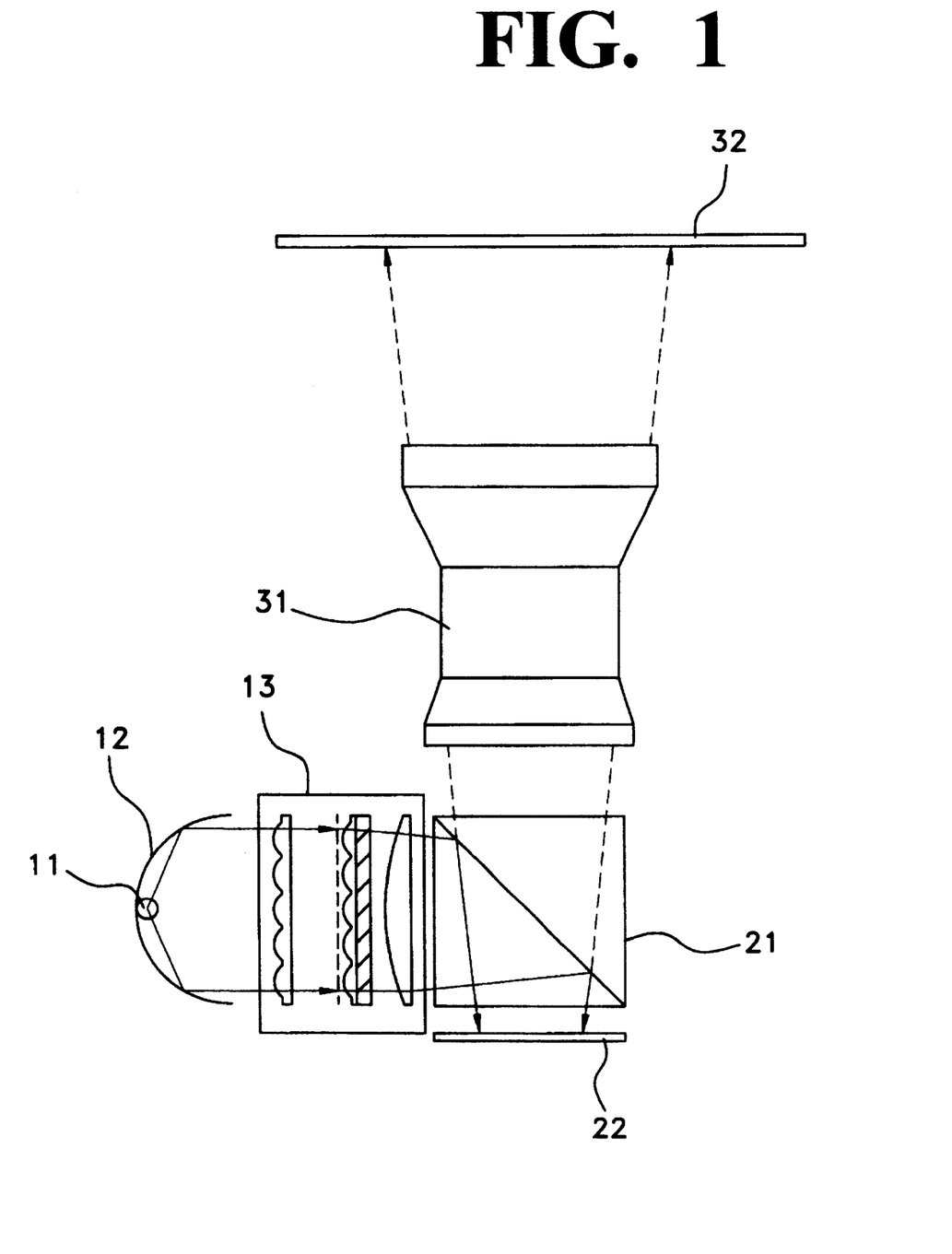
FIG. 1 is a block diagram illustrating a general projection display apparatus.

Now, the configuration of the above mentioned projection display apparatus would be described in brief with reference to FIG. 1.

In FIG. 1, the reference number 11 denotes a light source, which is an ultra-high pressure mercury lamp, the reference number 12 denotes a mirror, and the reference number 13 denotes illumination optics. Also, the reference number 21 denotes a polarized beam splitter (PBS), 22 a reflective light valve (imager), 31 a projection lens, and 32 a screen.

The ultra-high pressure mercury lamp 11 is a light source for the projection display apparatus. The brightness of the projection display apparatus is determined by the amount of light emitted from the ultra-high pressure mercury lamp 11.

After being reflected by the mirror 12, light from the ultra-high pressure mercury lamp 11 passes through the illumination optics 13. This illumination optics 13 serves to render the light from the ultra-high pressure mercury lamp 11 to be a uniform and substantially parallel light so as to allow the light to be focused onto the reflective light valve 22 at a maximum efficiency. For the illumination optics 13, a light tunnel, light pipe, or fly-eye lens is used. The reason why the light pipe is used that the light emitted from the lamp exhibits a non-uniform intensity such that it exhibits a strong intensity near its optical axis while exhibiting a gradually reduced intensity as it is spaced away from the optical axis. When such a light, which emerges from an LCD, after being reflected by that LCD, is projected onto a screen, it forms an image exhibiting a non-uniform brightness. For this reason, a light pipe is used to make light with a maximum uniformity emitted from a lamp have a non-uniform intensity.

The light emerging from the illumination optics 13 is incident onto the reflective light valve 22 via the PBS 21. The incident light is modulated by an output signal from the reflective light valve 22, and then reflected by a back plain. Finally, the light is projected in an enlarged state onto the screen 32 via the projection lens 31.

The projection lens 31 should have a very short projection length in order to minimize the thickness of a projection TV or monitor to which the projection lens 31 is applied. In other words, it is necessary to use a projection lens having a large field of view. Furthermore, for the projection lens 31, it is necessary to use a high performance projection lens having a high-resolution power to cope with an increase in the minimum number of pixels and a reduction in the effective size of the light valve. Although the uniformity in the amount of light and illumination in the projection system mainly depends on the performance of the illumination system used in the projection system, it is necessary to use a projection lens having a relatively low F-number (f/3.5 or less) and a high marginal light amount ratio (80% or more).

In the above mentioned projection display apparatus, a polarizing prism or dichroic filter should be arranged between the projection lens and the light valve in order to change respective axes of the optical path of the illumination system and the optical path of the projection lens 31 or to conduct a color separation/synthesis. By virtue of the arrangement of such an optical element, the projection lens must have a sufficiently long back focal length.

Furthermore, the polarizing prism or dichroic filter is provided with an optical coating in order to obtain a desired performance thereof. However, such an optical coating causes a considerable variation in the performance of the prism depending on the angle of incident light with respect to the plane of incidence.

For this reason, main beam of respective fields incident onto such an optical element should be incident vertically onto the light valve so as to avoid degradation in the optical performance at each field. To meet such a condition, the projection lens must have a telecentric structure.

The projection lens 31 exhibits a longitudinal chromatic aberration in the form of a misconvergence of red (R), green (G), and blue (B) colors. When such a misconvergence increases, one white line is displayed in the form of three separate R, G, and B lines. In other words, an increased misconvergence results in degradation in picture quality. Where the above mentioned projection display apparatus is used as a monitor adapted to mainly display characters, such a misconvergence causes a more severe problem. Accordingly, the projection lens should be implemented to exhibit a very small longitudinal chromatic aberration.

However, there is not known any lens capable of meeting performance requirements for the projection lens of the above mentioned projection display apparatus.

Although it is possible to easily implement a projection lens meeting one or a part of performance requirements for the projection display apparatus, it is difficult to implement a projection lens meeting all the given performance requirements. In particular, it is more difficult to implement a telecentric projection lens having a wide field of view of 60° or more and a long back focal length while meeting diverse performance requirements mentioned above.

SUMMARY OF THE INVENTION

Therefore, the present invention has been made in view of the above mentioned problems, and an object of the invention is to provide a projection lens of a projection display apparatus which is of a telecentric structure having a wide field of view of 60° or more and a long back focal length while meeting performance requirements for a projection system of a large screen, minimum thickness, and high picture quality.

Another object of the invention is to provide a projection lens of a projection display apparatus which not only has a wide field of view of 60° or more to reduce the thickness of a projection TV (or monitor), to which the projection lens is applied, but also has a long back focal length to allow an easy arrangement of color separating/synthesizing optical elements while having a telecentric structure to achieve an enhancement in the performance of the color separating/synthesizing optical elements and a reduction in longitudinal chromatic aberration.

Another object of the invention is to provide a projection lens of a projection display apparatus which not only has a wide field of view of 60° or more, but also meets a requirement of a back focal length to focal length ratio (BFL/F) more than 2.8 (BFL/F>2.8) to have a sufficiently long back focal length while having a telecentric structure for allowing the main beam of each field to be incident vertically onto the surface, even in the outermost field, a high-resolution power corresponding to 40% or more of the modulation transfer function (MTF) at a Nyquist frequency determined by the minimum number of pixels in the light valve, a distortion aberration of 1% or less, a low chromatic magnification, and a marginal light amount ratio of 85% or more to provide a uniform brightness over the entire portion of the screen.

In accordance with the present invention, these objects are accomplished by providing in a projection display apparatus including a light source, an optical illumination system, a light valve, a color separating/synthesizing system, and a projection lens, the projection lens comprising:

a first lens group arranged upstream from a screen, the first lens group having a negative power and including at least one aspherical lens element and at least three spherical lens elements, the lens element of the first lens group spaced away from the screen by a maximum distance having a positive power;

a second lens group arranged upstream from the first lens group, the second lens group having a positive power and including a triple cemented lens composed of three lens elements cemented together, and at least one lens element having a positive power arranged at one side of the triple cemented lens opposite to the screen; and an aperture stop arranged between the first and second lens groups, the first and second lens groups meet the following conditions:

$$-5.4 < d/f1 < -0.2 \quad (1)$$

$$0.4 < d/f2 < 5.1 \quad (2)$$

$$2.8 < bf1/f < 7.8 \quad (3)$$

where, "f1" represents the effective focal length of the first lens group, "f2" represents the effective focal length of the second lens group, "f" represents the effective focal length of the projection lens, "bf1" represents the back focal length of the projection lens, and "d" represents the distance between the first and second lens groups.

BRIEF DESCRIPTION OF THE DRAWINGS

The above objects, and other features and advantages of the present invention will become more apparent after a reading of the following detailed description when taken in conjunction with the drawings, in which.

DESCRIPTION OF THE PREFERRED EMBODIMENTS

Figure 2:
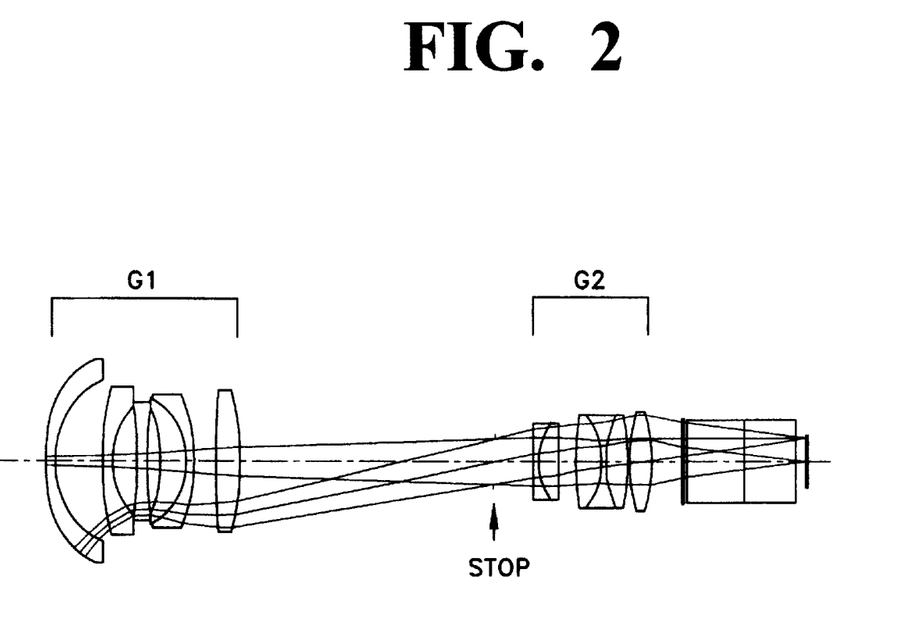
FIG. 2 is a schematic view illustrating a projection lens of a projection display apparatus according to an embodiment of the present invention.
Figure 6:
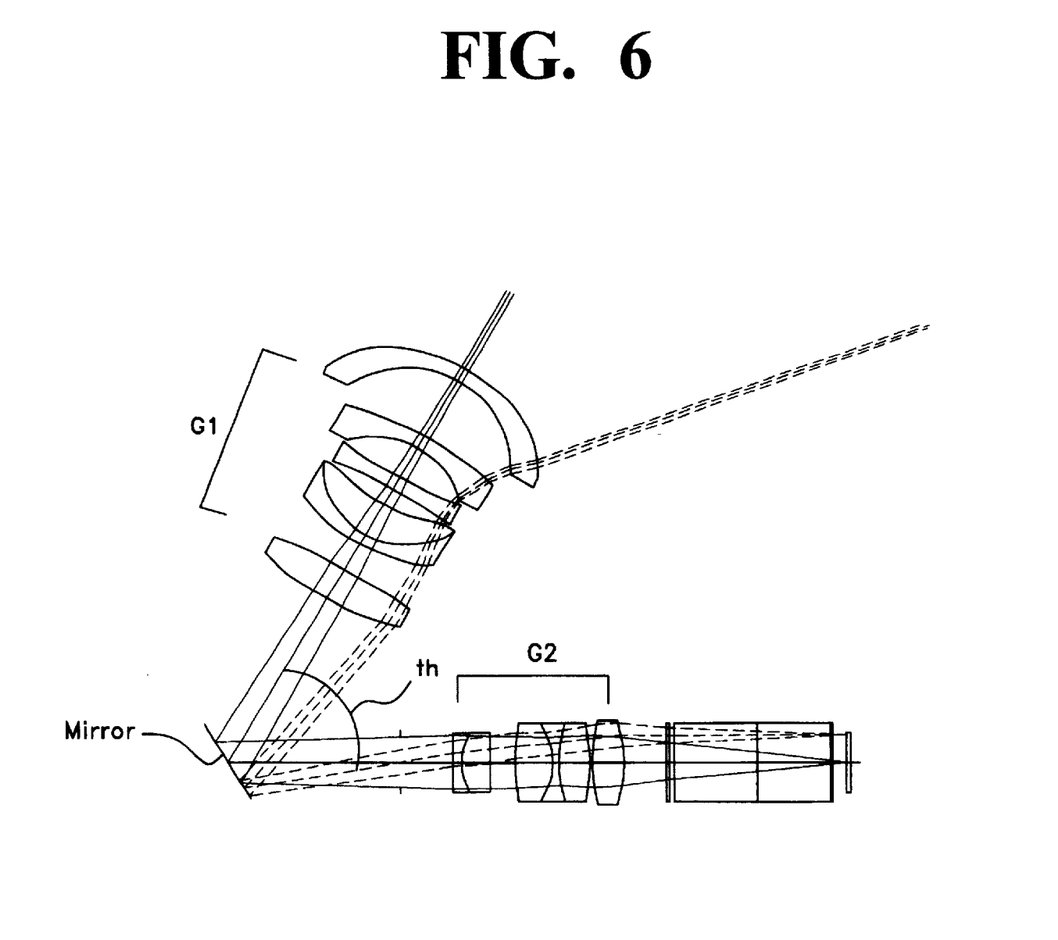
FIG. 6 is a view illustrating a projection lens of a projection display apparatus according to another embodiment of the present invention.

FIG. 2 is a view illustrating a projection lens of a projection display apparatus according to an embodiment of the present invention. FIG. 6 is a view illustrating a projection lens of a projection display apparatus according to another embodiment of the present invention.

Referring to FIG. 2, a projection display apparatus is illustrated which includes a light source 11, an optical illumination system 13, a light valve (imager) 22, a color separating/synthesizing system 21, and a projection lens 31. In accordance with an embodiment of the present invention, the projection lens 31 includes a first lens group G1 arranged upstream from a screen and having a negative power, a second lens group G2 arranged upstream from the first lens group G1 and having a positive power, and an aperture stop arranged between the first and second lens groups G1 and G2. Where "f1" represents the effective focal length of the first lens group G1, "f2" represents the effective focal length of the second lens group G2, "f" represents the effective focal length of the projection lens 31, "bf1" represents the back focal length of the projection lens 31, and "d" represents the distance between the first and second lens groups G1 and G2, the first and second lens groups G1 and G2 meet the following conditions:

$$-5.4 < d/f1 < -0.2 \quad (1)$$

$$0.4 < d/f2 < 5.1 \quad (2)$$

$$2.8 < bf1/f < 7.8 \quad (3)$$

The first lens group G1 includes at least one aspherical lens element and at least three spherical lens elements. The lens element of the first lens group G1 spaced away from the screen by a maximum distance has a positive power. The second lens group G2 includes a triple cemented lens composed of three lens elements cemented together, and at least one lens element having a positive power arranged at one side of the triple cemented lens opposite to the screen.

The aspherical lens element of the first lens group G1 has at least one aspherical surface.

The aspherical lens element of the first lens group G1 is arranged at a position nearest to the screen.

The triple cemented lens of the second lens group G2 has a positive optical power.

In the triple cemented lens of the second lens group G2, its central lens element has a negative optical power whereas two side lens elements arranged at opposite sides of the central lens element have positive optical powers, respectively.

The central and side lens elements in the triple cemented lens of the second lens group G2 have respective refractive indices Ndc and Nds meeting the following condition:

$$|Ndc-Nds|>0.16$$

Also, the central and side lens elements in the triple cemented lens of the second lens group G2 have respective Abbe numbers Vdc and Vds meeting the following condition:

$$|Vdc-Vds|>23$$

Alternatively, the central lens element in the triple cemented lens of the second lens group G2 has a positive optical power whereas two side lens elements have negative optical powers, respectively.

The projection lens may further include a mirror arranged between the first and second lens groups G1 and G2. Preferably, the mirror is arranged between the first lens group G1 and the aperture stop so as to change the optical path defined in the interior of the projection lens.

The mirror is configured to allow the angle, th, defined between a main beam incident onto the mirror and a main beam reflected by the mirror to meet the following condition:

$$45°<th<90°$$

The projection lens may further include a color separating/synthesizing prism block including the projection lens 31, the optical valve 22 and a plurality of prisms cemented together to joined the projection lens 31 and the optical valve 22 by the plurality of prisms.

The prism block has a refractive index Ndp and an Abbe number Vdp respectively meeting the following conditions:

$$Ndp>1.64$$

$$Vdp<33.0$$

The projection lens has a distortion of 1% or less.

The projection lens also exhibits a marginal light amount ratio of 84% or more.

Also, the projection lens has a field of view of 66° or more.

The focusing of the projection lens is carried out by shifting the second lens group G2 in a longitudinal direction of the second lens group G2 under the condition in which the distance between the first lens group G1 and the light valve is fixed.

Now, the operation of the projection lens in the projection display apparatus according to the present invention will be described in detail with reference to the annexed drawings.

The wide angle telecentric projection lens of the present invention having a long back focal length is used in a projection display apparatus including a light source, an illumination optics, a light valve (imager), a color separating/synthesizing system, and a projection lens. Preferably, this projection lens is used for a projection lens of a rear projection type projection TV (or monitor) adapted to project an image, formed by an image display apparatus having a plurality of pixels, onto a screen in an enlarged state, thereby enabling an enlarged high picture quality image to be displayed.

In order to meet such a requirement, the projection lens 31 of the present invention includes the first lens group G1 arranged upstream from a screen and having a negative power, the second lens group G2 arranged upstream from the first lens group G1 and having a positive power, and the aperture stop arranged between the first and second lens groups G1 and G2. The first and second lens groups G1 and G2 should also meet the following conditions:

$$-5.4<d/f1<-0.2 \tag{1}$$

$$0.4<d/f2<5.1 \tag{2}$$

$$2.8<bf1/f<7.8 \tag{3}$$

where, "f1" represents the effective focal length of the first lens group G1, "f2" represents the effective focal length of the second lens group G2, "f" represents the effective focal length of the projection lens 31, "bf1" represents the back focal length of the projection lens 31, and "d" represents the distance between the first and second lens groups G1 and G2.

In accordance with the present invention, the first lens group G1 preferably includes at least one aspherical lens element and at least three spherical lens elements. The lens element of the first lens group G1 spaced away from the screen by a maximum distance preferably has a positive power.

In accordance with the present invention, the second lens group G2 should include a triple cemented lens composed of three lens elements cemented together, and at least one lens element having a positive power arranged at one side of the triple cemented lens opposite to the screen.

Where the projection lens is configured to have a wide field of view of 60° or more, there are residual aberrations such as an aberration resulting from the curvature of an upper lens surface, a distortion aberration, and a longitudinal chromatic aberration. To this end, a plastic aspherical lens having at least one aspherical surface is arranged in the first lens group G1 to reduce the upper surface curvature aberration to a desired level while reducing the distortion aberration to 1% or less. In this case, the aspherical lens should be precisely machined. In the manufacture of aspherical lenses made of glass, such a machining is required for individual lenses. However, where aspherical lenses made of a plastic material are manufactured using a mold, there are advantages in that the manufacturing costs and the number of processing steps are reduced.

Since the projection display apparatus uses a light source emitting a very large quantity of energy, the projection lens is subjected to a severe temperature variation. Such a temperature variation results in a variation in the performance of the projection lens. Furthermore, it is also necessary to take into consideration a temperature variation occurring in the surroundings. In the case of a plastic aspherical lens, it exhibits a relatively severe variation in performance depending on a variation in temperature, as compared to glass lenses. Therefore, it is necessary for the plastic aspherical lens to have a low refractivity, if possible, in order to minimize the influence of temperature thereon.

In order to maintain a desired molding temperature and a desired molding pressure during the injection molding of the lens, the thickness difference between the central and peripheral portions of the lens should be minimized.

To meet such a requirement, the aspherical lens element of the first lens group G1 has a low negative optical power or a low positive optical power. The aspherical surface of the aspherical lens element is expressed by the following aspherical equation:

$$z = \frac{y^2}{R + \sqrt{R^2 - (1+K)y^2}} + Ay^4 + By^6 + Cy^8 + Dy^{10} \quad \text{[Equation 1]}$$

where, "z" represents an optical axis direction, "y" represents a direction perpendicular to the optical axis direction, "R" represents the radius of curvature of the lens surface, "K" represents a conical coefficient, and A, B, C and D represent aspherical coefficients, respectively.

Generally, a reflective liquid crystal light valve (imager) means used in a projection display apparatus uses three light valves (imagers) respectively expressing three primary colors, that is, R, G, and B. Images respectively emerging from the three light valves are synthesized together by a color separating/synthesizing system, and then projected onto a screen in an enlarged state via a projection lens. Where the projection lens exhibits a large longitudinal chromatic aberration, it is caused a misalignment of the R, G and B images at the peripheral region of the screen by virtue of a chromatic magnification difference among the R, G, and B images.

To this end, in the projection lens of the present invention, the second lens group G2 uses a triple cemented lens composed of three lens elements cemented together, in order to achieve a reduction in longitudinal chromatic aberration.

The triple cemented lens of the second lens group G2 has a positive optical power. In this triple cemented lens, its central lens element has a negative optical power whereas two side lens elements arranged at opposite sides of the central lens have positive optical powers, respectively. The central and side lens elements in the triple cemented lens have respective refractive indices Ndc and Nds meeting the following condition:

$|Ndc-Nds|>0.16$

Also, the central and side lens elements in the triple cemented lens have respective Abbe numbers Vdc and Vds meeting the following condition:

$|Vdc-Vds|>23$

The lens element of the first lens group G1 arranged at a To position nearest to the aperture stop exhibits a positive refractivity. Also, the lens element of the second lens group G2 arranged at a position farthest to the aperture stop exhibits a positive refractivity.

Meanwhile, in order to minimize the size and thickness of the projection display apparatus, the mirror is arranged between the first and second lens groups G1 and G2, thereby enabling the optical path, defined in the interior of the projection lens, to be changed, as shown in FIG. 12. Preferably, the mirror is arranged between the first lens group G1 and the aperture stop so as to change the optical path in the interior of the projection lens.

By virtue of this arrangement, it is possible to reduce the depth of the projection display apparatus. In particular, it is possible to achieve an easy adjustment, as compared to a system in which two or three mirrors are arranged between the projection lens and the screen. In addition, there is an advantage in terms of reliability. In this case, the mirror is configured to allow the angle defined between a main beam incident onto the mirror and a main beam reflected by the mirror to meet the following condition:

$45°<th<90°$

In the case of a lens having an arrangement capable of achieving an optical path change in the interior of the lens, as in the projection lens of FIG. 6 in which the mirror is arranged between the first and second lens groups G1 and G2, the position of an image projected onto the screen is vertically shifted on the screen as the lens is shifted along the optical axis during a focusing operation conducted when the lens is mounted in the projection display apparatus. In the case of the projection lens shown in FIG. 6, therefore, its focusing operation can be carried out by shifting only the second lens group G2 in a longitudinal direction of the second lens group G2.

In a projection display apparatus using a reflective liquid crystal light valve (imager), its illumination optics and color separating/synthesizing system are arranged between the projection lens and the light valve.

As described above, the projection lens of the present invention is used in the projection display apparatus including the light source 11, the illumination optics 13, the light valve (imager) 22, the polarized beam splitter 21, that is, the color separating/synthesizing system, and the projection lens 31. This projection lenses include two lens groups, that is, a first lens group G1 arranged upstream from the screen while having a negative power and a second lens group G2 arranged upstream from the first lens group G1 while having a positive power, and a color separating/synthesizing prism block including a plurality of prisms cemented together.

In this case, the projection lens should be designed taking into consideration the color separating/synthesizing prism block. Generally, an increase in the refractivity of the prism block results in a reduction in back focal length. In this case, accordingly, it is possible to reduce the size of the projection lens. By virtue of this possibility, the correction of spherical aberrations and off-axial aberrations are easily carried out. Where the prism block is made of low-dispersive glass exhibiting a small difference among refractive indices at different wavelengths, it is possible to reduce the longitudinal chromatic aberration generated in the projection lens due to the provision of three light valves respectively adapted to express three primary colors of R, G, and B. Accordingly, there is an advantage in correcting the chromatic magnification difference among R, G, and B images. Therefore, the color separating/synthesizing prism block included in the projection lens of the present invention has a refractive index Ndp and an Abbe number Vdp respectively meeting the following conditions:

$Ndp>1.64$ $Vdp<33.0$

In the case of a projection display apparatus using three light valves, as mentioned above, a zoom lens exhibiting different back focal lengths at different wavelengths is designed because panels respectively associated with R, G and B are adjustable independently of one another. By virtue of such a design, it is possible to achieve improvements in chromatic magnification and MTF (Modulation Transfer Function) performance.

Now, examples of a projection lens meeting all the above described requirements will be described.

Figure 3:
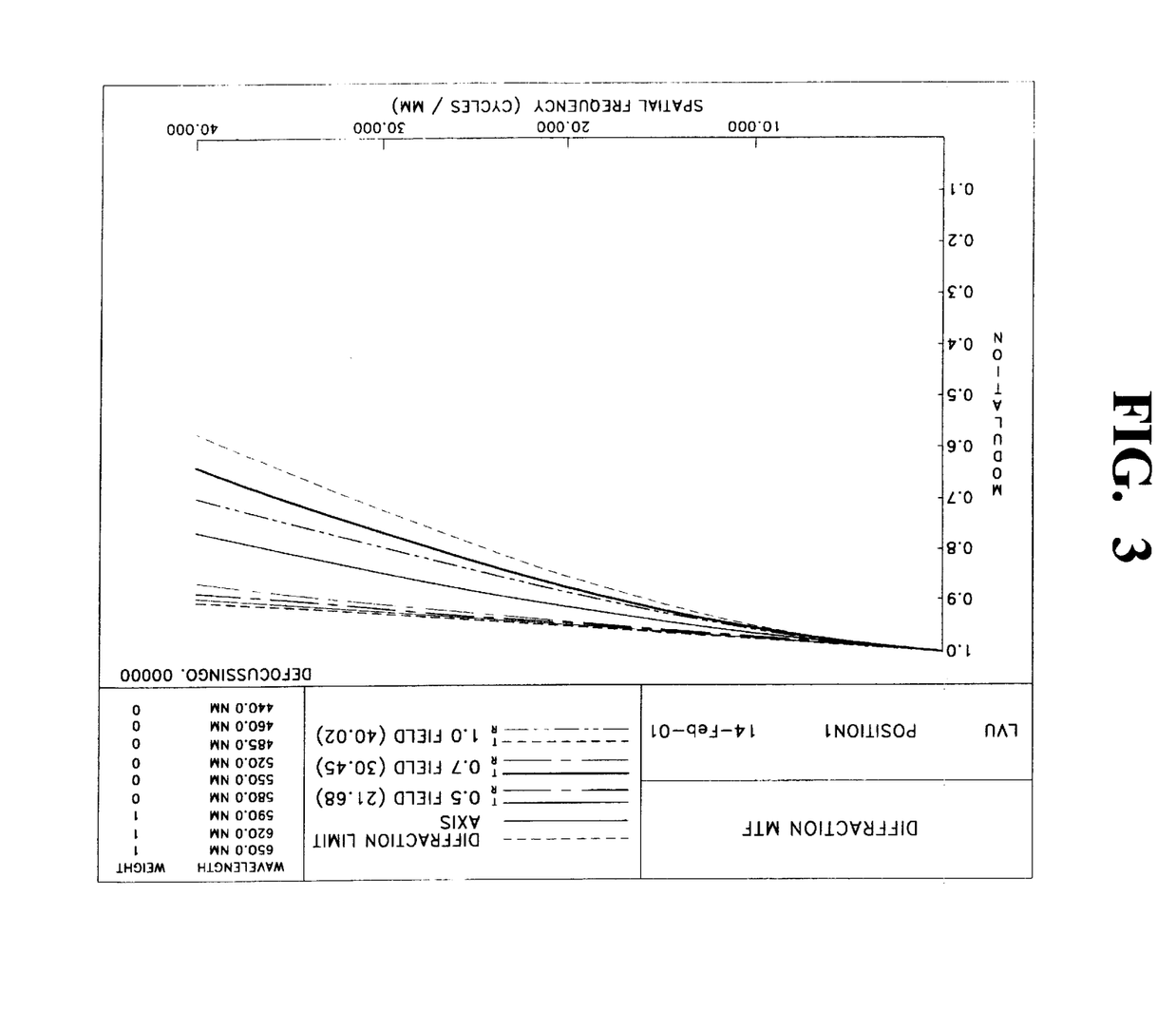
FIG. 3 is a graph depicting analysis results of MTF in the first example of Table 1.

Table 1 is illustrating a first example of the projection lens shown in FIG. 2. FIG. 3 is a graph depicting analysis results of MTF in the first example of Table 1.

TABLE 1

| | RADIUS | THICKNESS | Nd | Vd |
|---|---|---|---|---|
| OBJ: | INFINITY | 540.000000 | | |
| 1: | 78.70784 | 5.000000 | 1.492000 | 57.1000 |
| | ASPHERIC SURFACE: | | | |
| | K: 2.218449 | | | |
| | A: 0.934410E − 06 | B: 0.125542E − 08 | C: −.954133E − 12 | D: 0.212070E − 15 |
| 2: | 37.29446 | 23.700000 | | |
| | ASPHERIC SURFACE: | | | |
| | K: 0.053179 | | | |
| | A: −.849250E − 06 | B: 0.363847E − 08 | C: −.216156E − 11 | D: −.296822E − 15 |
| 3: | 125.68927 | 5.000000 | 1.755199 | 27.5305 |
| 4: | 31.48412 | 12.421938 | | |
| 5: | −160.00000 | 5.000000 | 1.563839 | 60.8301 |
| 6: | 160.00000 | 6.519286 | | |
| 7: | −61.01801 | 13.000000 | 1.603420 | 38.0299 |
| 8: | −29.34008 | 4.000000 | 1.744002 | 44.7200 |
| 9: | −63.37559 | 11.000000 | | |
| 10: | 364.63158 | 12.384505 | 1.603420 | 38.0299 |
| 11: | −98.43770 | 129.631359 | | |
| STOP: | INFINITY | 19.100000 | | |
| 13: | 850.00000 | 3.000000 | 1.716998 | 47.9611 |
| 14: | 23.92095 | 10.000000 | 1.755199 | 27.5305 |
| 15: | −179.78647 | 8.800000 | | |
| 16: | 126.51535 | 13.000000 | 1.487489 | 70.4412 |
| 17: | −28.07726 | 2.200000 | 1.755198 | 27.5302 |
| 18: | 42.15786 | 11.000000 | 1.487489 | 70.4412 |
| 19: | −73.89607 | 1.000000 | | |
| 20: | 71.45247 | 11.000000 | 1.603110 | 60.6946 |
| 21: | −61.40521 | 15.000000 | | |
| 22: | INFINITY | 1.000000 | 1.516798 | 64.1983 |
| 23: | INFINITY | 1.500000 | | |
| 24: | INFINITY | 28.800000 | 1.647689 | 33.8482 |
| 25: | INFINITY | 25.900000 | 1.846662 | 23.8256 |
| 26: | INFINITY | 0.700000 | 1.516798 | 64.1983 |
| 27: | INFINITY | 5.0 | | |
| 28: | INFINITY | 1.100000 | 1.516798 | 64.1985 |
| IMG: | INFINITY | 0.000000 | | |

In the projection lens according to the example, it is satisfied with following conditions. Its field of view is 80°. Also, the effective focal length F of the projection lens is 11.499. The effective focal length F1 of the first lens group G1 is −69.06 whereas the effective focal length F2 of the second lens group G2 is 57.23. The wide field of view is 60° or more and the long back focal length BFL/F is 4.7 in the back focal length BFL of 54.55. A telecentric condition is allowed the main beam of the outermost field to be incident onto a light valve surface in perpendicular.

In Table 1, the thickness of the 27-th surface corresponds to 5.002 mm, 5.0 mm, and 5.0205 mm at three zoom positions defined in the distance between respective R, G, and B panels and the optical element for color separation/synthesis.

FIG. 3 shows the results of an MTF analysis conducted at a spatial frequency up to 40 linepair/mm using a "CODE V" (the lens designing software of ORA company). Referring to FIG. 3, it can be seen that an MTF of 40% or more is obtained at a spatial frequency of 40 linepair/mm for all fields.

Figure 4:
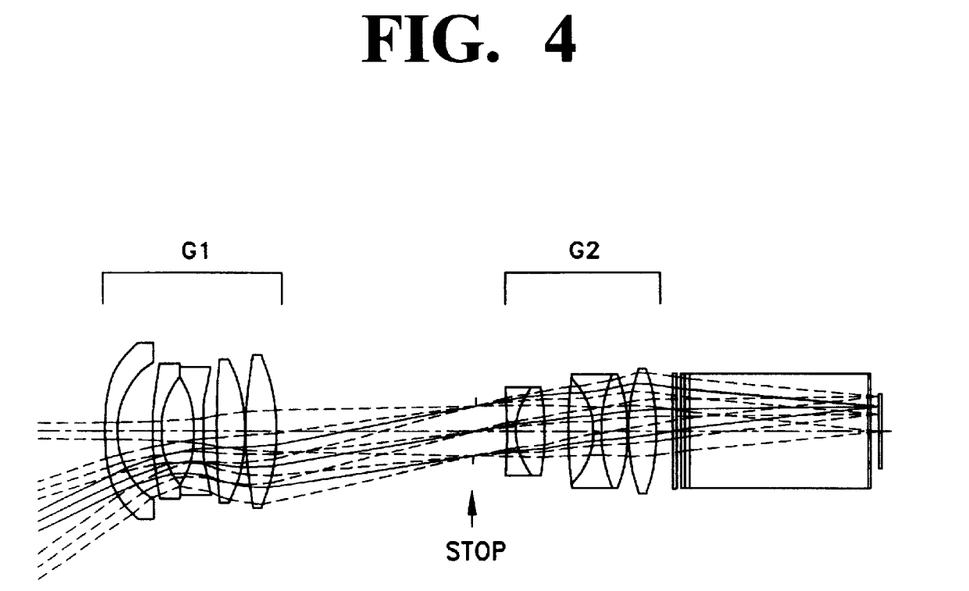
FIG. 4 is a schematic view illustrating the layout of Table 2, along with beam.
Figure 5:
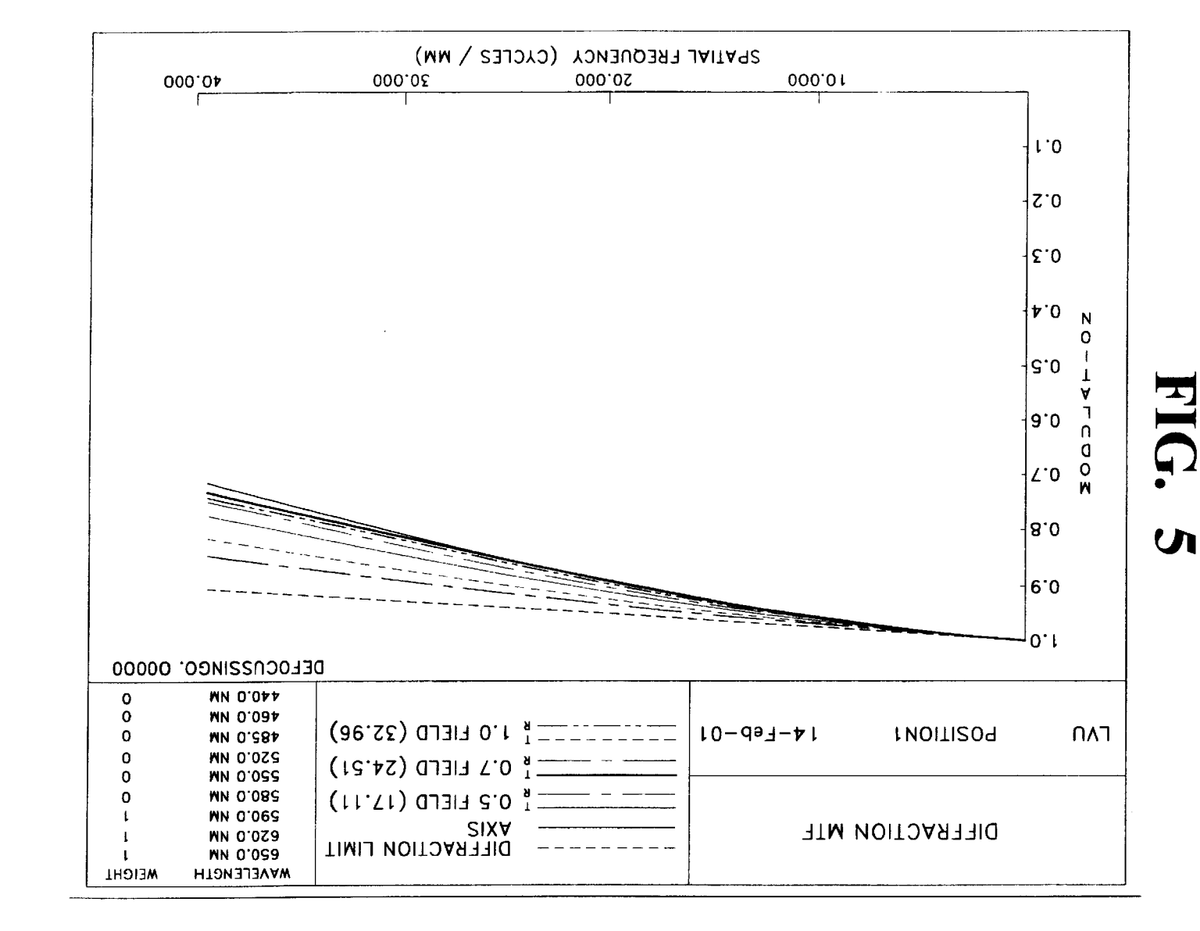
FIG. 5 is a graph depicting analysis results of MTF in the second example of Table 2.

Table 2 is illustrating a second example of the projection lens shown in FIG. 2. FIG. 4 is a schematic view illustrating the layout of Table 2, along with beam. FIG. 5 is a graph depicting analysis results of MTF in the second example of Table 2.

In the projection lens according to the example, it is satisfied with following conditions. Its field of view is 66°. Also, the effective focal length F of the projection lens is 14.99. The effective focal length F1 of the first lens group G1 is −151.59 whereas the effective focal length F2 of the second lens group G2 is 42.815. The wide field of view is 60° or more and the long back focal length BFL/F is 2.8 in the back focal length BFL of 42.242. A telecentric condition is allowed the main beam of the outermost field to be incident onto a light valve surface in perpendicular.

In Table 2, the thickness of the 27-th surface corresponds to 2.48016 mm, 2.5 mm, and 2.54487 mm at three zoom positions it defined in the distance between respective R, G, and B panels and the optical element for color separation/synthesis.

TABLE 2

| | RADIUS | THICKNESS | Nd | Vd |
|---|---|---|---|---|
| OBJ: | INFINITY | 450.000000 | | |
| 1: | 70.11788 | 3.800000 | 1.492000 | 57.1000 |
| | ASPHERIC SURFACE: | | | |
| | K: 4.962903 | | | |
| | A: 0.922600E − 05 | B: −.223740E − 08 | C: 0.000000E + 00 | D: 0.000000E + 00 |

TABLE 2-continued

| | RADIUS | THICKNESS | Nd | Vd |
|---|---|---|---|---|
| 2: | 27.04569 | 11.138420 | | |
| | ASPHERIC SURFACE: | | | |
| | K: −1.101540 | | | |
| | A: 0.142531E − 04 | B: 0.172110E − 07 | C: 0.000000E + 00 | D: 0.000000E + 00 |
| 3: | 98.74432 | 2.600000 | 1.589128 | 61.2526 |
| 4: | 25.77401 | 9.930264 | | |
| 5: | −31.29662 | 2.800000 | 1.755199 | 27.5305 |
| 6: | 67.49116 | 4.282723 | | |
| 7: | 220.74214 | 8.773917 | 1.603419 | 38.0106 |
| 8: | −44.24024 | 0.200000 | | |
| 9: | 112.26585 | 9.423619 | 1.581439 | 40.8907 |
| 10: | −55.00218 | 61.353965 | | |
| STOP: | INFINITY | 10.715968 | | |
| 12: | −127.00206 | 2.800000 | 1.716998 | 47.9611 |
| 13: | 19.19043 | 8.979675 | 1.755199 | 27.5305 |
| 14: | −66.44009 | 7.543979 | | |
| 15: | 183.11477 | 7.792129 | 1.487489 | 70.4412 |
| 16: | −21.06304 | 2.200000 | 1.755198 | 27.5302 |
| 17: | 38.99451 | 8.486305 | 1.487489 | 70.4412 |
| 18: | −44.24024 | 0.200000 | | |
| 19: | 55.00218 | 8.598881 | 1.603110 | 60.6946 |
| 20: | −55.00218 | 5.000000 | | |
| 21: | INFINITY | 1.000000 | 1.516798 | 64.1983 |
| 22: | INFINITY | 1.500000 | | |
| 23: | INFINITY | 1.000000 | 1.516798 | 64.1983 |
| 24: | INFINITY | 1.500000 | 1.550000 | 50.0000 |
| 25: | INFINITY | 55.200000 | 1.846662 | 23.8256 |
| 26: | INFINITY | 0.700000 | 1.516798 | 64.1983 |
| 27: | INFINITY | 2.500000 | | |
| 28: | INFINITY | 1.100000 | 1.516798 | 64.1983 |
| IMG: | INFINITY | 0.000000 | | |

FIG. 5 shows the results of an MTF analysis conducted at a spatial frequency up to 40 linepair/mm using the "CODE V" (the lens designing software of ORA company). Referring to FIG. 5, it can be seen that an MTF of 40% or more is obtained at a spatial frequency of 40 linepair/mm for all fields.

Table 3 is illustrating a third example of the projection lens shown in FIG. 2.

TABLE 3

| | RADIUS | THICKNESS | Nd | Vd |
|---|---|---|---|---|
| OBJ: | INFINITY | 560.000000 | | |
| 1: | 185.85848 | 7.800000 | 1.492000 | 57.1000 |
| | ASPHERIC SURFACE: | | | |
| | K: 3.300474 | | | |
| | A: 0.393322E − 06 | B: −.129511E − 09 | C: −.761463E − 14 | D: −.116965E − 17 |
| 2: | 97.40266 | 4.600000 | | |
| | ASPHERIC SURFACE: | | | |
| | K: −9.289157 | | | |
| | A: −.559233E − 06 | B: 0.898122E − 10 | C: −.172015E − 13 | D: −.167674E − 17 |
| 3: | 405.91275 | 3.200000 | 1.755199 | 27.5305 |
| 4: | 87.34872 | 21.727393 | 1.516798 | 64.1983 |
| 5: | −224.08248 | 6.693089 | | |
| 6: | 46.98371 | 2.600000 | 1.744002 | 44.7200 |
| 7: | 13.29422 | 13.165295 | | |
| 8: | −28.05156 | 1.800000 | 1.744002 | 44.7200 |
| 9: | 28.05156 | 10.600000 | 1.603419 | 38.0106 |
| 10: | −78.48956 | 9.790251 | | |
| 11: | 105.55120 | 7.200000 | 1.698944 | 30.0506 |
| 12: | −105.55120 | 52.831551 | | |
| STOP: | INFINITY | 13.408848 | | |
| 14: | −152.25700 | 2.800000 | 1.716998 | 47.9611 |
| 15: | 17.49745 | 9.494726 | 1.755199 | 27.5305 |
| 16: | −68.96429 | 4.537513 | | |
| 17: | 108.45527 | 8.647337 | 1.487489 | 70.4412 |
| 18: | −19.79304 | 2.200000 | 1.755198 | 27.5305 |
| 19: | 33.97477 | 8.717297 | 1.487489 | 70.4412 |
| 20: | −60.44431 | 0.400000 | | |

TABLE 3-continued

|      | RADIUS    | THICKNESS | Nd       | Vd      |
|------|-----------|-----------|----------|---------|
| 21:  | 66.78502  | 9.401764  | 1.603110 | 60.6946 |
| 22:  | −42.17616 | 14.000000 |          |         |
| 23:  | INFINITY  | 1.000000  | 1.516798 | 64.1983 |
| 24:  | INFINITY  | 1.500000  |          |         |
| 25:  | INFINITY  | 28.800000 | 1.647689 | 33.8482 |
| 26:  | INFINITY  | 25.90000  | 1.846662 | 23.8256 |
| 27:  | INFINITY  | 0.700000  | 1.516798 | 64.1983 |
| 28:  | INFINITY  | 2.484934  |          |         |
| >29: | INFINITY  | 1.100000  | 1.516798 | 64.1983 |
| IMG: | INFINITY  | 0.000000  |          |         |

In the projection lens according to the example described in Table 3 of FIG. 8, it is satisfied with following conditions. Its field of view is 76.2°. Also, the effective focal length F of the projection lens is 12.172. The effective focal length F1 of the first lens group G1 is −46.4 whereas the effective focal length F2 of the second lens group G2 is 44.61. The wide field of view is 60° or more and the long back focal length BFL/F is 4.2 in the back focal length BFL of 51.257. A telecentric condition is allowed the main beam of the outermost field to be incident onto a light valve surface in perpendicular.

Table 4 is illustrating a fourth example of the projection lens shown in FIG. 2.

In the projection lens according to the example described in Table 4, it is satisfied with following conditions. Its field of view is 79.7°. Also, the effective focal length F of the projection lens is 12.217. The effective focal length F1 of the first lens group G1 is −53.269 whereas the effective focal length F2 of the second lens group G2 is 47.65. The wide field of view is 60° or more and the long back focal length BFL/F is 4.4 in the back focal length BFL of 53.89. A telecentric condition is allowed the main beam of the outermost field to be incident onto a light valve surface in perpendicular.

Table 5 is illustrating a fifth example of the projection lens shown in FIG. 2.

TABLE 4

|       | RADIUS              | THICKNESS        | Nd                  | Vd                  |
|-------|---------------------|------------------|---------------------|---------------------|
| OBJ:  | INFINITY            | 550.000000       |                     |                     |
| 1:    | 54.12247            | 3.800000         | 1.492000            | 57.1000             |
|       | ASPHERIC SURFACE:   |                  |                     |                     |
|       | K: 1.573351         |                  |                     |                     |
|       | A: 0.674899E − 05   | B: −.106946E − 08 | C: 0.000000E + 00  | D: 0.000000E + 00  |
| 2:    | 28.99368            | 12.425458        |                     |                     |
|       | ASPHERIC SURFACE:   |                  |                     |                     |
|       | K: −2.987658        |                  |                     |                     |
|       | A: 0.195198E − 04   | B: 0.428296E − 08 | C: 0.000000E + 00  | D: 0.000000E + 00  |
| 3:    | 128.80707           | 2.800000         | 1.747600            | 37.1023             |
| 4:    | 30.19730            | 15.338375        |                     |                     |
| 5:    | 93.37002            | 2.600000         | 1.744000            | 44.7000             |
| 6:    | 34.96475            | 13.233637        |                     |                     |
| 7:    | −30.84130           | 2.800000         | 1.572465            | 63.0503             |
| 8:    | −59.98418           | 1.199447         |                     |                     |
| 9:    | 2514.57747          | 5.073154         | 1.582526            | 41.0162             |
| 10:   | −70.49557           | 0.294997         |                     |                     |
| 11:   | −2391.23133         | 4.939323         | 1.673148            | 35.5359             |
| 12:   | −71.08269           | 64.000000        |                     |                     |
| STOP: | INFINITY            | 11.975729        |                     |                     |
| 14:   | −135.05089          | 2.800000         | 1.716998            | 47.9611             |
| 15:   | 20.27637            | 9.751138         | 1.755199            | 27.5305             |
| 16:   | −64.39001           | 6.181027         |                     |                     |
| 17:   | 266.53142           | 8.609736         | 1.487489            | 70.4412             |
| 18:   | −21.03469           | 2.200000         | 1.755198            | 27.5302             |
| 19:   | 42.95067            | 8.702788         | 1.487489            | 70.4412             |
| 20:   | −67.59450           | 0.100000         |                     |                     |
| 21:   | −1291.24473         | 4.176773         | 1.516798            | 64.1983             |
| 22:   | −113.15583          | 0.100000         |                     |                     |
| 23:   | 89.76361            | 8.998417         | 1.578168            | 62.2996             |
| 24:   | −47.79363           | 15.000000        |                     |                     |
| 25:   | INFINITY            | 1.000000         | 1.516798            | 64.1983             |
| 26:   | INFINITY            | 1.500000         |                     |                     |
| 27:   | INFINITY            | 31.300000        | 1.647689            | 33.8482             |
| 28:   | INFINITY            | 25.900000        | 1.846662            | 23.8256             |
| 29:   | INFINITY            | 0.700000         | 1.516798            | 64.1983             |
| 30:   | INFINITY            | 2.500000         |                     |                     |
| 31:   | INFINITY            | 1.100000         | 1.516798            | 64.1983             |
| IMG:  | INFINITY            | 0.000000         |                     |                     |

TABLE 5

|  | RADIUS | THICKNESS | Nd | Vd |
|---|---|---|---|---|
| OBJ: | INFINITY | 532.006748 | | |
| 1: | 75.06456 | 3.800000 | 1.492000 | 57.1000 |
| | ASPHERIC SURFACE: | | | |
| | K: 2.906907 | | | |
| | A: 0.186893E − 05 | B: −.435502E − 09 | C: 0.000000E + 00 | D: 0.000000E + 00 |
| 2: | 30.58247 | 11.144823 | | |
| | ASPHERIC SURFACE: | | | |
| | K: −2.302706 | | | |
| | A: 0.735731E − 05 | B: −.723276E − 09 | C: 0.000000E + 00 | D: 0.000000E + 00 |
| 3: | 96.60368 | 12.000000 | 1.566707 | 45.6381 |
| 4: | −75.09012 | 2.000000 | 1.755198 | 27.5302 |
| 5: | −450.64453 | 1.266914 | | |
| 6: | 94.89034 | 2.600000 | 1.744000 | 44.7000 |
| 7: | 17.75563 | 9.911742 | | |
| 8: | −38.83772 | 8.800000 | 1.567334 | 43.4944 |
| 9: | −16.12728 | 2.600000 | 1.744000 | 44.7000 |
| 10: | −163.58055 | 1.547785 | | |
| 11: | 160.09996 | 8.200000 | 1.623261 | 40.8084 |
| 12: | −40.58371 | 58.504455 | | |
| STO: | INFINITY | 9.857715 | | |
| 14: | 1629.64737 | 2.800000 | 1.716998 | 47.9611 |
| 15: | 17.76734 | 8.655699 | 1.755199 | 27.5305 |
| 16: | −100.02345 | 10.993888 | | |
| 17: | 268.90957 | 7.473830 | 1.487489 | 70.4412 |
| 18: | −20.40146 | 2.200000 | 1.755198 | 27.5302 |
| 19: | 37.06064 | 9.103066 | 1.487489 | 70.4412 |
| 20: | −46.75565 | 0.100000 | | |
| 21: | 59.53424 | 8.740083 | 1.603110 | 60.6946 |
| 22: | −49.64700 | 14.000000 | | |
| 23: | INFINITY | 1.000000 | 1.516798 | 64.1983 |
| 24: | INFINITY | 1.500000 | | |
| 25: | INFINITY | 27.000000 | 1.647689 | 33.8482 |
| 26: | INFINITY | 27.000000 | 1.846662 | 23.8256 |
| 27: | INFINITY | 0.700000 | 1.516798 | 64.1983 |
| 28: | INFINITY | 2.500000 | | |
| 29: | INFINITY | 1.100000 | 1.516798 | 64.1983 |
| IMG: | INFINITY | 0.000000 | | |

In the projection lens according to the example described in Table 5, it is satisfied with following conditions. Its field of view is 80.8°. Also, the effective focal length F of the projection lens is 11.195. The effective focal length F1 of the first lens group G1 is −34.071 whereas the effective focal length F2 of the second lens group G2 is 45.773. The wide field of view is 60° or more and the long back focal length BFL/F is 4.5 in the back focal length BFL of 50.75. A telecentric condition is allowed the main beam of the outermost field to be incident onto a light valve surface in perpendicular.

Table 6 is illustrating a sixth example of the projection lens shown in FIG. 2.

TABLE 6

|  | RADIUS | THICKNESS | Nd | Vd |
|---|---|---|---|---|
| OBJ: | INFINITY | 540.000000 | | |
| 1: | 73.54647 | 5.000000 | 1.492000 | 57.1000 |
| | ASPHERIC SURFACE: | | | |
| | K: 1.708866 | | | |
| | A: −.562408E − 06 | B: 0.186508E − 08 | C: −.674529E − 12 | D: 0.391593E − 16 |
| 2: | 37.99018 | 17.000000 | | |
| | ASPHERIC SURFACE: | | | |
| | K: −0.032907 | | | |
| | A: −.177723E − 05 | B: 0.136099E − 08 | C: 0.193460E − 11 | D: −.194373E − 14 |
| 3: | INFINITY | 6.665098 | | |
| 4: | 157.39258 | 5.000000 | 1.755199 | 27.5305 |
| 5: | 32.58464 | 13.000000 | | |
| 6: | −160.00000 | 5.000000 | 1.563839 | 60.8301 |
| 7: | 160.00000 | 5.000000 | | |
| 8: | −133.53410 | 13.000000 | 1.603420 | 38.0299 |
| 9: | −29.38839 | 4.000000 | 1.744002 | 44.7200 |
| 10: | −105.37172 | 11.000000 | | |
| 11: | 451.49177 | 12.000000 | 1.603420 | 38.0299 |
| 12: | −80.15704 | 150.000000 | | |
| STO: | INFINITY | 26.066 | | |
| 14: | 816.98841 | 3.000000 | 1.716998 | 47.9611 |
| 15: | 24.30254 | 10.000000 | 1.755199 | 27.5305 |

TABLE 6-continued

|  | RADIUS | THICKNESS | Nd | Vd |
|---|---|---|---|---|
| 16: | −164.10964 | 8.813891 |  |  |
| 17: | 103.71281 | 10.000000 | 1.487489 | 70.4412 |
| 18: | −29.27867 | 2.200000 | 1.755198 | 27.5302 |
| 19: | 40.82757 | 8.486305 | 1.487489 | 70.4412 |
| 20: | −114.83730 | 0.100000 |  |  |
| 21: | 67.53347 | 11.000000 | 1.603110 | 60.6946 |
| 22: | −59.13659 | 15.000000 |  |  |
| 23: | INFINITY | 1.000000 | 1.516798 | 64.1983 |
| 24: | INFINITY | 1.500000 |  |  |
| 25: | INFINITY | 28.800000 | 1.647689 | 33.8482 |
| 26: | INFINITY | 25.900000 | 1.846682 | 23.8256 |
| 27: | INFINITY | 0.700000 | 1.516798 | 64.1983 |
| 28: | INFINITY | 5.00 |  |  |
| 29: | INFINITY | 1.100000 | 1.516798 | 64.1983 |
| IMG: | INFINITY | 0.000000 |  |  |

In the projection lens according to the example described in Table 6, it is satisfied with following conditions. Its field of view is 79.6°. Also, the effective focal length F of the projection lens is 11.555. The effective focal length F1 of the first lens group G1 is −73.15 whereas the effective focal length F2 of the second lens group G2 is 57.702. The wide field of view is 60° or more and the long back focal length BFL/F is 3.4 in the back focal length BFL of 39.762. A telecentric condition is allowed the main beam of the outermost field to be incident onto a light valve surface in perpendicular.

In each of the examples described above, the projection lens has a field of view of 60° or more. Accordingly, it is possible to reduce the thickness of a projection TV (or monitor) to which the projection lens is applied. Also, the projection lens has a long back focal length, thereby allowing an easy arrangement of color separating/synthesizing optical elements. The projection lens is also designed to have a telecentric structure, thereby being capable of achieving an enhancement in the performance of the color separating/synthesizing optical elements and a reduction in longitudinal chromatic aberration.

In order to minimize the depth of a projection TV (or monitor), it is necessary to use a projection lens having a very short projection length. For such a very short projection length, the projection lens should have a relatively wide field of view. The projection lens of the present invention meets requirements for projection lens in terms of resolution power, distortion, chromatic magnification, and marginal light amount ratio while having a field of view of 60° or more. In accordance with the present invention, a mirror is arranged in the interior of the projection lens so that the optical path defined by the projection lens can be refracted. Accordingly, the height of the entire set can be minimized. Moreover, focusing operation of the projection lens can be conveniently carried out by adjusting only the downstream lens group of the projection lens.

Resolution power is a basic index indicative of the focusing and contrast performance of a lens. In a procedure of projecting an image through a lens in an enlarged state to map the image, resolution power represents a quantitative expression of the performance index for expressing the performance of the image to be equivalent to that of the original image as much as possible. In this connection, the projection lens of the present invention meets performance requirements. Where a light valve of SXGA 0.7 inch is used, the projection lens of the present invention exhibits performances of 60% or more at its central portion and 40% or more at its peripheral portion in terms of the MTF value at 40 linepair/mm which is the numerical expression of a target resolution power.

In order to obtain a maximum performance for optical elements such as PBSs and dichroic filters, it is necessary to design a projection lens having a telecentric structure. In other words, central light beams of all fields incident to the projection lens must be parallel. Therefore, the position of an entrance pupil is to be infinite. In accordance with the present invention, a telecentric design meeting such conditions is implemented. That is, the present invention implements a projection lens capable of maintaining a maximum performance of a color separating/synthesizing optical element.

For the arrangement of a color separating/synthesizing system, an appropriate power distribution is made for the upstream and downstream lens groups of the projection lens in accordance with the present invention. By virtue of such an appropriate power distribution, a back focal length of 80 mm or more is secured.

In accordance with the present invention, a zoom lens exhibiting different back focal lengths at different wavelengths is designed taking into consideration the fact that R, G, and B panels of a three-panel type projection apparatus are adjusted independently of one another. By virtue of such a design, there are improvements in chromatic magnification and MTF performance.

Although wide-angle lens exhibits a very low marginal light amount ratio, the projection lens of the present invention exhibits a high marginal light amount ratio of 80% or more without requiring any mechanical means.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. In a projection display apparatus including a light source, an optical illumination system, a light valve, a color separating/synthesizing system, and a projection lens, the projection lens comprising:

a first lens group arranged upstream from a screen, the first lens group having a negative power and including at least one aspherical lens element and at least three spherical lens elements, the lens element of the first lens group spaced away from the screen by a maximum distance having a positive power;

a second lens group arranged upstream from the first lens group, the second lens group having a positive power and including a triple cemented lens composed of three lens elements cemented together, and at least one lens element having a positive power arranged at one side of the triple cemented lens opposite to the screen; and an aperture stop arranged between the first and second lens groups, the first and second lens groups meet the following conditions:

$$-5.4 < d/f1 < -0.2 \quad (1)$$

$$0.4 < d/f2 < 5.1 \quad (2)$$

$$2.8 < bf1/f < 7.8 \quad (3)$$

where, "f1" represents the effective focal length of the first lens group, "f2" represents the effective focal length of the second lens group, "f" represents the effective focal length of the projection lens, "bf1" represents the back focal length of the projection lens, and "d" represents the distance between the first and second lens groups.

2. The projection lens according to claim 1, wherein the aspherical lens element of the first lens group has at least one aspherical surface.

3. The projection lens according to claim 1, wherein the aspherical lens element of the first lens group is arranged at a position nearest to the screen.

4. The projection lens according to claim 1, wherein the triple cemented lens of the second lens group has a positive optical power.

5. The projection lens according to claim 1, wherein the central one of the lens elements in the triple cemented lens of the second lens group has a negative optical power, and the remaining two side lens elements arranged at opposite sides of the central lens element have positive optical powers, respectively.

6. The projection lens according to claim 5, wherein the central and side lens elements in the triple cemented lens of the second lens group have respective refractive indices Ndc and Nds meeting the following condition:

$$|Ndc-Nds|>0.16.$$

7. The projection lens according to claim 5, wherein the central and side lens elements in the triple cemented lens of the second lens group have respective Abbe numbers Vdc and Vds meeting the following condition:

$$|Vdc-Vds|>23.$$

8. The projection lens according to claim 1, wherein the central one of the lens elements in the triple cemented lens of the second lens group has a positive optical power, and the remaining two side lens elements arranged at opposite sides of the central lens element have negative optical powers, respectively.

9. The projection lens according to claim 1, further comprising:

a mirror arranged between the first and second lens groups and the mirror arranged between the first lens groups and the aperture stop to change an optical path defined in the interior of the projection lens.

10. The projection lens according to claim 9, wherein the mirror is configured to allow an angle, th, defined between a main beam incident onto the mirror and a main beam reflected by the mirror to meet the following condition:

$$45° < th < 90°.$$

11. The projection lens according to claim 1, further comprising:

a color separating/synthesizing prism block including the projection lens 31, the optical valve 22 and a plurality of prisms cemented together to joined the projection lens 31 and the optical valve 22 by the plurality of prisms.

12. The projection lens according to claim 11, wherein the prism block has a refractive index Ndp and an Abbe number Vdp respectively meeting the following conditions:

$$Ndp>1.64$$

$$Vdp<33.0.$$

13. The projection lens according to claim 1, wherein the projection lens has a distortion of 1% or less.

14. The projection lens according to claim 1, wherein the projection lens also exhibits a marginal light amount ratio of 84% or more.

15. The projection lens according to claim 1, wherein the projection lens has a field of view of 66° or more.

16. The projection lens according to claim 1, wherein the projection lens is focused in accordance with a shifting operation of the second lens group in a longitudinal direction of the second lens group under the condition in which the distance between the first lens group and the light valve is fixed.

* * * * *